(12) United States Patent
Nam et al.

(10) Patent No.: US 9,767,593 B2
(45) Date of Patent: Sep. 19, 2017

(54) APPARATUS AND METHOD FOR PROCESSING ANIMATION

(71) Applicant: SAMSUNG ELECTRONICS CO., LTD., Suwon-si, Gyeonggi-do (KR)

(72) Inventors: Ki-Hoon Nam, Suwon-si (KR); In-ho Kye, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/002,625

(22) Filed: Jan. 21, 2016

(65) Prior Publication Data

US 2016/0232700 A1 Aug. 11, 2016

(30) Foreign Application Priority Data

Feb. 9, 2015 (KR) ........................ 10-2015-0019662

(51) Int. Cl.
 *G06T 13/00* (2011.01)
 *G06T 13/80* (2011.01)
 *G06F 17/30* (2006.01)

(52) U.S. Cl.
 CPC .......... *G06T 13/80* (2013.01); *G06F 17/3089* (2013.01); *G06T 13/00* (2013.01)

(58) Field of Classification Search
 CPC ...... G06F 17/3089; G06T 13/00; G06T 13/80
 See application file for complete search history.

(56) References Cited

U.S. PATENT DOCUMENTS

| 5,619,628 | A | * | 4/1997 | Fujita | ..................... | G06T 13/20 |
| | | | | | | 345/419 |
| 8,164,596 | B1 | | 4/2012 | Bech | | |
| 8,234,564 | B2 | | 7/2012 | Drieu et al. | | |
| 8,643,653 | B2 | | 2/2014 | Marchant et al. | | |
| 2013/0086463 | A1 | | 4/2013 | Mandal et al. | | |
| 2013/0346851 | A1 | * | 12/2013 | Leece | ............... | G06F 17/30905 |
| | | | | | | 715/235 |

FOREIGN PATENT DOCUMENTS

EP 2 214 137 8/2010

OTHER PUBLICATIONS

European Search Report mailed on Jun. 3, 2016 in corresponding European Patent Application No. 16 150 723.1.
Office Action issued on Jun. 13, 2016 in corresponding European Patent Application No. 16 150 723.1.

\* cited by examiner

*Primary Examiner* — Charles Tseng
(74) *Attorney, Agent, or Firm* — Staas & Halsey LLP (57) ABSTRACT

An apparatus for processing an animation includes an animation control unit configured to determine an animation processing mode as an interpolated animation mode or a cascading style sheets level 3 (CSS3) animation mode according to a property of the animation, the property being received through an application program interface (API), an animation engine unit configured to calculate a matrix of an object for each frame and to process the animation based on the calculated matrix if the animation processing mode is determined as the interpolated animation mode, and a web engine unit configured to process the animation based on a target matrix of the object and CSS 3 transition if the animation processing mode is determined as the CSS3 animation mode.

15 Claims, 5 Drawing Sheets

APPARATUS AND METHOD FOR PROCESSING ANIMATION

CROSS-REFERENCE TO RELATED APPLICATIONS

This application claims the benefit of Korean Patent Application No. 10-2015-0019662, filed on Feb. 9, 2015, in the Korean Intellectual Property Office, the disclosure of which is incorporated herein in its entirety by reference.

BACKGROUND

1. Field

The present disclosure relates to apparatuses and methods for processing an animation, and more particularly, to apparatuses and methods for processing an animation, whereby an animation processing method may be controlled according to a property of the animation.

2. Description of the Related Art

A webpage is a document created using hypertext markup language (HTML) and may include not only text but also various pieces of web content such as an image, a video, an audio, and the like in the body thereof. The pieces of web content included in the webpage are properly respectively arranged using HTML according to tags related to a layout. At the beginning, HTML was used to make only static webpages. However, recently, HTML has been extended to make dynamic webpages by utilizing techniques such as Java scripts and cascading style sheets (CSSs).

In general, a process by which a web browser based on a web engine displays a webpage on a screen is as follows. First, the web browser reads an HTML document to load necessary resources. Next, the web engine parses the loaded resources to make a document object model (DOM) tree and a render tree. Finally, the web engine creates a webpage by performing a layout operation based on the render tree and a painting operation on each piece of web content included in the HTML document and displays the created webpage on the screen.

SUMMARY

Provided are apparatuses and methods for processing an animation, whereby animation processing may be optimized by adaptively using a cascading style sheets level 3 (CSS3) animation processing method or an interpolated animation processing method according to a property of the animation.

Additional aspects will be set forth in part in the description which follows and, in part, will be apparent from the description, or may be learned by practice of the presented exemplary embodiments.

According to an aspect of an exemplary embodiment, an apparatus for processing an animation includes: an animation control unit configured to determine an animation processing mode as an interpolated animation mode or a cascading style sheets level 3 (CSS3) animation mode according to a property of the animation, the property being received through an application program interface (API); an animation engine unit configured to calculate a matrix of an object for each frame and to process the animation based on the calculated matrix, if the animation processing mode is determined as the interpolated animation mode; and a web engine unit configured to process the animation based on a target matrix of the object and CSS3 transition if the animation processing mode is determined as the CSS3 animation mode.

The animation control unit may be further configured to determine the animation processing mode as the CSS3 animation mode if the property of the animation includes at least one of translate, opacity, scale, rotate, perspective, and matrix.

The animation control unit may be further configured to determine the animation processing mode as the interpolated animation mode if the property of the animation includes at least one of pause, reverse, seek, and time line animation.

The animation control unit may be further configured to set a default mode of the animation processing mode as the CSS3 animation mode, and may change the CSS3 animation mode to the interpolated animation mode if the animation processing mode is determined as the interpolated animation mode.

The animation engine unit may be further configured to calculate a matrix of the object at a changed time point if the animation processing mode is changed from the CSS3 animation mode to the interpolated animation mode.

The animation control unit may be further configured to change the interpolated animation mode to the CSS3 animation mode if the animation processing mode is determined as the CSS3 animation mode.

The animation engine unit may be further configured to set a target matrix of the object if the animation processing mode is changed from the interpolated animation mode to the CSS3 animation mode.

The target matrix may indicate a target location of the object.

The CSS3 transition may include at least one of a delay, a direction, a duration, and an iteration-count of the animation.

According to an aspect of another exemplary embodiment, a method of processing an animation includes: determining an animation processing mode as an interpolated animation mode or a cascading style sheets level 3 (CSS3) animation mode according to a property of the animation, the property being received through an application program interface (API); calculating a matrix of an object for each frame and processing the animation based on the calculated matrix, if the animation processing mode is determined as the interpolated animation mode; and processing the animation based on a target matrix of the object and CSS3 transition if the animation processing mode is determined as the CSS3 animation mode.

The determining of the animation processing mode may include determining the animation processing mode as the CSS3 animation mode if the property of the animation includes at least one of translate, opacity, scale, rotate, perspective, and matrix.

The determining of the animation processing mode may include determining the animation processing mode as the interpolated animation mode if the property of the animation includes at least one of pause, reverse, seek, and time line animation.

The method may further include: setting a default mode of the animation processing mode as the CSS3 animation mode; and changing the CSS3 animation mode to the interpolated animation mode if the animation processing mode is determined as the interpolated animation mode.

The method may further include calculating a matrix of the object at a changed time point if the animation processing mode is changed from the CSS3 animation mode to the interpolated animation mode.

The method may further include changing the interpolated animation mode to the CSS3 animation mode if the animation processing mode is determined as the CSS3 animation mode.

The method may further include setting a target matrix of the object if the animation processing mode is changed from the interpolated animation mode to the CSS3 animation mode.

According to an aspect of another exemplary embodiment, a method of processing an animation may include receiving, through an application program interface, animation information of objects included in content, the animation information including a property of the animation, determining an animation processing mode of a plurality of animation processing modes based on the received property of the animation, and operating in the determined animation processing mode.

According to an aspect of another exemplary embodiment, an apparatus processing an animation may include an application program interface to receive animation information of objects included in content, the animation information including a property of the animation, and an animation controller including a hardware-based processor to determine an animation processing mode of a plurality of animation processing modes based on the received property of the animation and to operate in the determined animation processing mode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

The terms used in the specification will be briefly described, and then, the inventive concept will be described in detail.

Although general current terms have been used to describe the inventive concept based on the functions in the inventive concept, the terms may vary according to the intention of one of ordinary skill in the art, case precedents, and the appearance of new technology. In addition, in specific situations, terms selected by the applicant may be used, and in these situations, the meaning of these terms will be disclosed in corresponding descriptions of the specification. Accordingly, the terms used in the specification to describe the inventive concept are defined not by their simple names but by their meanings in the context of the inventive concept.

In the specification, when a certain part "includes" a certain component, this indicates that the part may further include another component instead of excluding the other component unless there is different disclosure. In addition, a term such as " . . . unit" or "module" disclosed in the specification indicates a unit for processing at least one function or operation, which may be implemented by hardware, software, or a combination thereof.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. In the drawings, parts irrelevant to the description are omitted to clearly describe the inventive concept. Accordingly, the exemplary embodiments are merely described below, by referring to the figures, to explain aspects thereof.

As used herein, expressions such as "at least one of," when preceding a list of elements, modify the entire list of elements and do not modify the individual elements of the list.

Figure 1A:
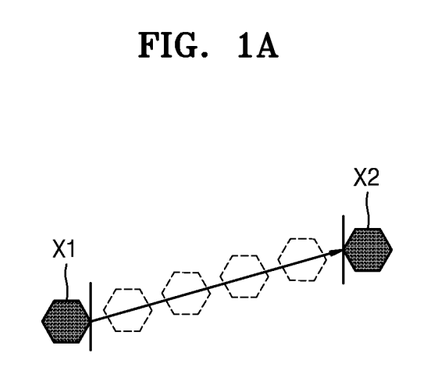
FIGS. 1A and 1B illustrate reference diagrams for describing a method of processing an animation, according to an exemplary embodiment of the inventive concept.
Figure 1B:
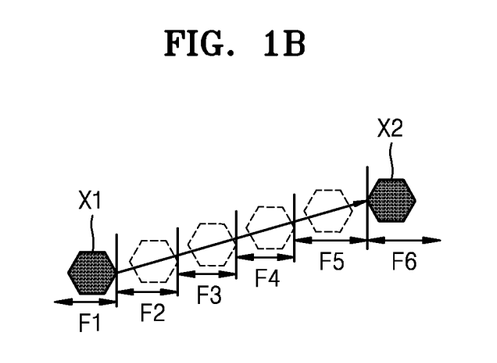

FIGS. 1A and 1B illustrate reference diagrams for describing a method of processing an animation, according to an exemplary embodiment of the inventive concept.

FIG. 1A illustrates a method of processing a CSS3 animation, according to an exemplary embodiment of the inventive concept, and FIG. 1B illustrates a method of processing an interpolated animation, according to an exemplary embodiment of the inventive concept.

Referring to FIG. 1A, with regard to the CSS3 animation, when a command for moving an object from X1 (a start location) to X2 (a target location) is received, a web engine unit (not shown) may process the animation by performing a calculation in an intermediate operation of moving the object from X1 to X2. In addition, the web engine unit may process the CSS3 animation based on a CSS3 transition. For example, if a duration of the CSS3 transition is set, the web engine unit may calculate intermediate locations of the object according to the set duration.

Referring to FIG. 1B, with regard to the interpolated animation, an animation engine unit (not shown) may perform, for each frame, a calculation in an intermediate operation of the animation in which an object moves from X1 (a start location) to X2 (a target location). For example, when the animation in which the object moves from X1 to X2 is played during six frames, the animation engine unit may calculate each of a location of the object in a first frame F1, a location of the object in a second frame F2, a location of the object in a third frame F3, a location of the object in a fourth frame F4, a location of the object in a fifth frame F5, and a location of the object in a sixth frame F6.

As described above, with regard to the CSS3 animation, since the web engine unit may perform a calculation on the animation (e.g., a calculation in an intermediate operation) and render the animation, the animation may be processed with high performance. However, since the web engine unit may perform the calculation on the animation, only animation properties supported by the web engine unit may be processed, and thus, it is difficult to process a composite animation.

Meanwhile, with regard to the interpolated animation, since the animation engine unit may calculate the animation for each frame, a composite animation may be processed. However, since the animation engine unit may perform a calculation for each frame, the performance of processing the animation is somewhat deteriorated.

Therefore, an apparatus 100 for processing an animation, according to an exemplary embodiment of the inventive concept, may optimize the performance of the animation by adaptively using both a CSS3 animation processing method and an interpolated animation processing method as a method of processing the animation.

Figure 2:
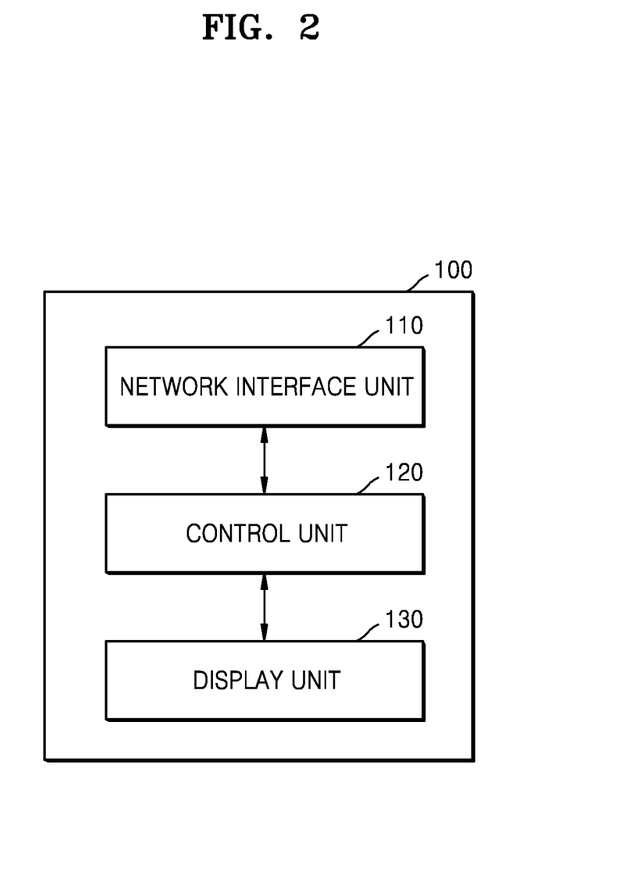
FIG. 2 illustrates a block diagram of an apparatus for processing an animation, according to an exemplary embodiment of the inventive concept.

FIG. 2 illustrates a block diagram of the apparatus 100 according to an exemplary embodiment of the inventive concept.

According to an exemplary embodiment, the apparatus 100 may be implemented as one of various electronic devices such as a TV, a cellular phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, a wearable device, and the like but is not limited thereto.

Referring to FIG. 2, the apparatus 100 may include a network interface unit 110, a control unit 120, and a display unit 130.

The network interface unit 110 may provide an interface for connecting the apparatus 100 to a wired/wireless network such as the Internet. For example, the network interface unit 110 may receive, over a network, content or data provided by an Internet or content provider or a network operator.

In addition, the network interface unit 110 may access the Internet to receive an HTML document and to deliver the received HTML document to the control unit 120. The HTML document may include content. The content may indicate various kinds of data provided through the Internet, computer communication, or the like and may include web content. The web content may include a text, an image, an icon, a thumbnail, and the like as elements of the HTML document. In addition, if the content includes a motion, the motion of the content or a function of performing the motion of the content may be referred to as an animation. In addition, if the content includes a motion, the content may be referred to as animation content.

Figure 3:
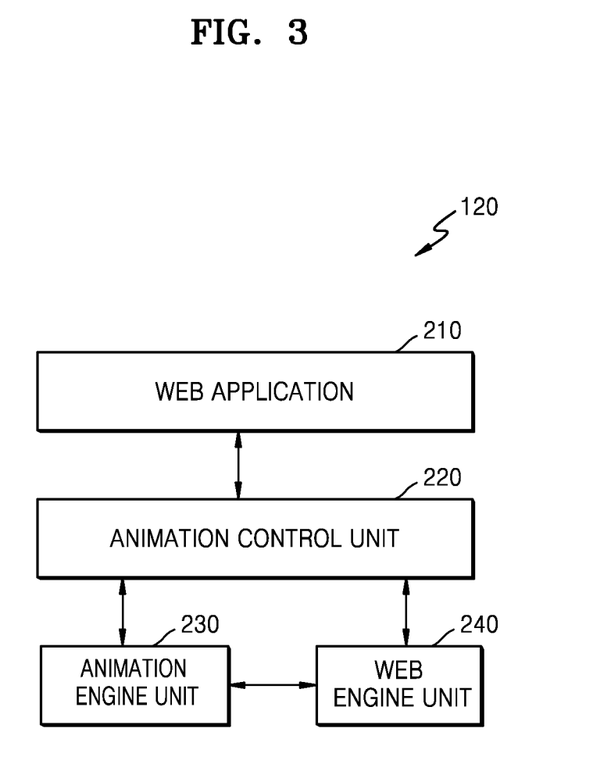
FIG. 3 illustrates a block diagram of a control unit in the apparatus of FIG. 2.

The control unit 120 may control a general operation of the apparatus 100 and a signal flow between the internal components of the apparatus 100 and perform a function of processing data. In addition, the control unit 120 may execute various kinds of applications stored in a program region. Particularly, according to an exemplary embodiment, the control unit 120 may include a web application 210, an animation control unit 220, an animation engine unit 230, and a web engine unit 240 to process an animation, as shown in FIG. 3. The control unit 120 may comprise one or more hardware-based processors such as a microprocessor, custom application specific circuit ("asic"), or firmware, etc.

The web application 210 is an application for implementing a network service and may be an application for receiving an HTML document by accessing the Internet through the network interface unit 110.

The web application 210 may provide animation information of objects included in content to the animation control unit 220 through an application program interface (API). The API may be configured to provide a language or a message format to be used when the web application 210 communicates with the animation control unit 220.

The animation information provided through the API may include property information of an animation, and the animation control unit 220 may determine an animation processing mode depending on the property or property information of the animation. If the property of the animation is an interpolation-required property, the animation control unit 220 may determine the animation processing mode as an interpolated animation mode.

For example, when the property of the animation includes at least one of pause, reverse, seek, and time line animation, the animation control unit 220 may determine that the animation requires interpolation and may determine the animation processing mode as the interpolated animation mode.

The terms "pause", "reverse", and "seek" may indicate controlling a flow of the animation, wherein the term "pause" may indicate stopping the animation by a user input (e.g., a holding input using a mouse or a touch tool) in the middle of an operation of the animation and the term "reverse" may indicate playing the animation in a reverse direction of a designated direction.

The term "time line animation" may indicate that the animation is definable for each time line. For example, if an object A moves from 0 to 600 in five seconds while being magnified to double in size for a duration from two seconds to three seconds and to rotate by 90 degrees for a duration from three seconds to four seconds, the object A is both magnified and rotated while moving for five seconds. As such, according to the time line animation property, two or more animation effects may be applied together.

Otherwise, if the property of the animation does not include any interpolation-required property, the animation control unit 220 may determine the animation processing mode as a CSS3 animation mode.

For example, when the property of the animation includes at least one of translate, opacity, scale, rotate, perspective, and matrix, the animation control unit 220 may determine that the animation does not require interpolation and may determine the animation processing mode as the CSS3 animation mode.

If the animation includes only the properties which do not require interpolation, such as translate, opacity, scale, rotate, perspective, matrix, and the like, the animation control unit 220 may determine the animation processing mode as the CSS3 animation mode.

The term "translate" indicates that an object moves, the term "opacity" indicates that the transparency of an object changes such that the object becomes gradually vivid, dim, or the like, and the term "scale" indicates that an object is reduced or magnified. In addition, the term "rotate" indicates that an object rotates, the term "perspective" indicates a sense of perspective of an object, and the term "matrix" indicates a matrix directly assigned by a user.

The animation control unit 220 may set a default mode of the animation processing mode as the CSS3 animation mode. When the animation processing mode is determined as the interpolated animation mode, the animation control unit 220 may change the CSS3 animation mode to the interpolated animation mode. Alternatively, when the animation processing mode is determined as the CSS3 animation mode, the animation control unit 220 may change the interpolated animation mode to the CSS3 animation mode.

If the animation processing mode is the interpolated animation mode, the animation engine unit 230 may calculate a matrix of each of the objects to be rendered in one frame and transmit a rendering command based on the calculated matrix to the web engine unit 240. In this case, the matrix of each of the objects may be calculated for each frame, and the calculated matrix may be transmitted to the web engine unit 240. For example, for an animation moving from 0 to 600 on an X axis, the animation engine unit 230 may render objects by calculating an X coordinate value for each frame (e.g., X=0 in a first frame, X=10 in a second frame, X=20 in a third frame, . . . ) and transmitting the calculated X coordinate value to the web engine unit 240. That is, the animation engine unit 230 may perform a calculation in an intermediate operation of the animation.

The matrix of each of the objects may be calculated using an animation parameter of each of the objects. The animation parameter may indicate how many pixels are moved by an object, how much the object is magnified or reduced, or the like.

Otherwise, if the animation processing mode is the CSS3 animation mode, the animation engine unit 230 may transmit a rendering command to the web engine unit 240 by setting a target matrix of an object.

When the web engine unit 240 receives the target matrix (e.g., translate X(600) from the animation engine unit 230, the web engine unit 240 may process the animation so that the object moves from 0 to 600 on an X axis. That is, the web engine unit 240 may directly perform a calculation in an intermediate operation of the animation.

In addition, the web engine unit 240 may perform a CSS3 animation based on CSS3 transition. For example, the CSS3 transition may include at least one of a delay, a direction, a duration, and an iteration-count. The term "delay" may indicate starting an animation after objects are loaded, and the term "direction" may indicate restarting an animation from the beginning or in a reverse direction after the animation ends. The term "duration" may indicate how long one cycle of an animation is played, and the term "iteration-count" may indicate how many times an animation is iterated.

Referring back to FIG. 2, the display unit 130 may display a rendered frame. The display unit 130 may be implemented as a plasma display panel (PDP), a liquid crystal display (LCD), an organic light-emitting display (OLED), a flexible display, a three-dimensional (3D) display, or the like. In addition, the display unit 130 may be configured to include a touch screen to be used as an input device besides an output device.

The block diagrams of the apparatus 100 shown in FIGS. 2 and 3 are only illustrative. Each component in the block diagrams may be integrated, added, or omitted according to a specification of the apparatus 100 to be actually implemented. That is, according to circumstances, two or more components may be integrated into one component, or one component may be separated into two or more components. In addition, the function performed by each block is to describe embodiments, and a detailed operation or device of each block does not limit the right scope of the inventive concept.

Figure 4:
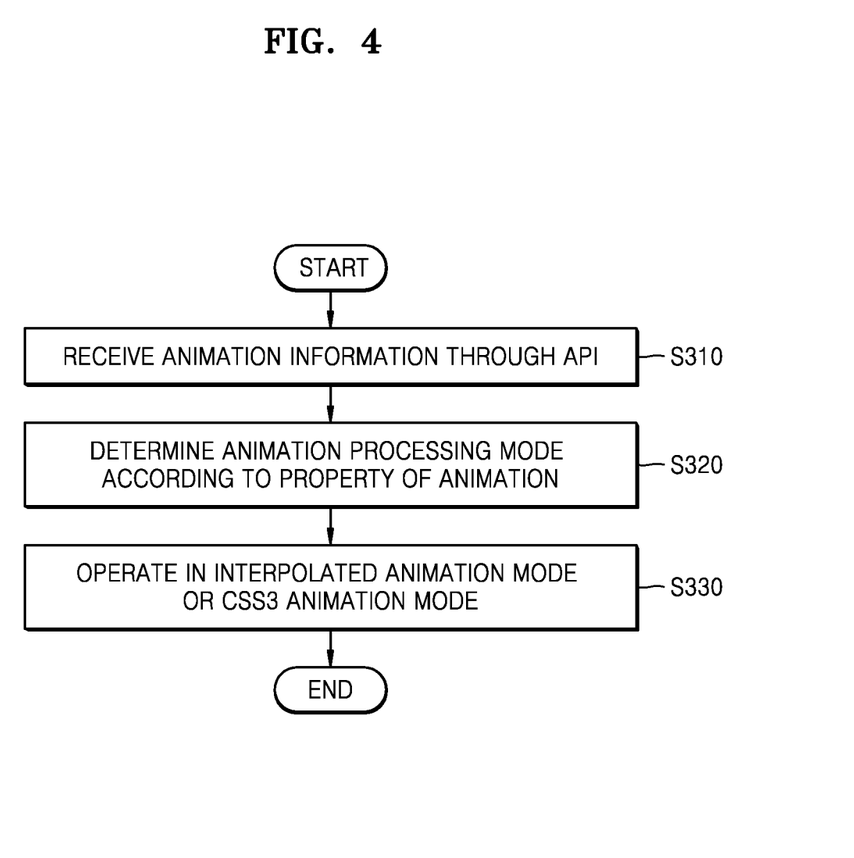
FIG. 4 illustrates a flowchart of a method of processing an animation, according to an exemplary embodiment of the inventive concept.

FIG. 4 illustrates a flowchart of a method of processing an animation, according to an exemplary embodiment of the inventive concept.

Referring to FIG. 4, in operation S310, the apparatus 100 as an example, may receive, through an API, animation information of objects included in content.

The animation information received through the API may include a property property information of the animation.

In operation S320, the apparatus 100 determines an animation processing mode based on the property information of the animation.

The apparatus 100 may determine the animation processing mode as the interpolated animation mode if the property of the animation includes an interpolation-required property and may determine the animation processing mode as the CSS3 animation mode if the property of the animation does not include any interpolation-required property.

In operation S330, the apparatus 100 operates in the interpolated animation mode or the CSS3 animation mode according to the determined animation processing mode.

For example, the CSS3 animation mode may indicate the animation processing mode in which the web engine unit 240 performs a calculation on the animation (e.g., a calculation in an intermediate operation) and renders the animation. The interpolated animation mode may indicate the animation processing mode in which the animation engine unit 230 performs a calculation on the animation for each frame. This will now be described in detail with reference to FIG. 5.

Figure 5:
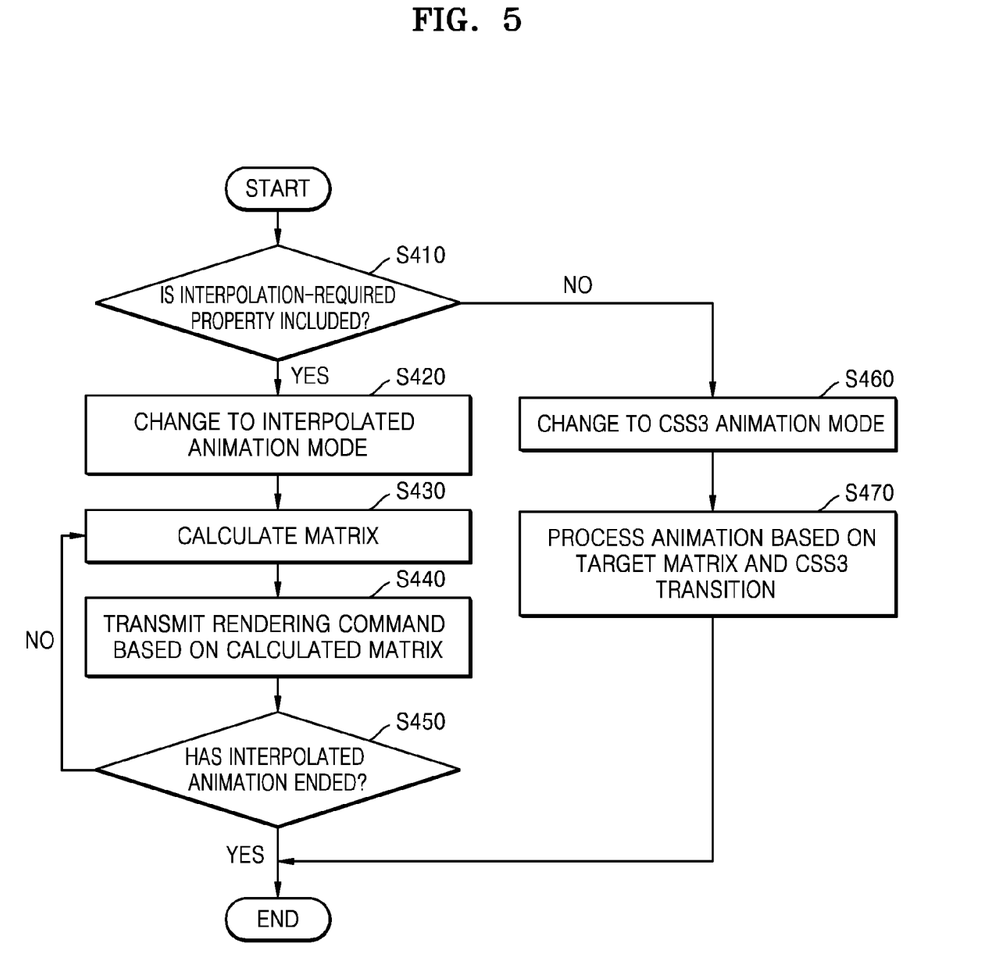
FIG. 5 illustrates a detailed flowchart of the method of FIG. 5, according to an exemplary embodiment of the inventive concept.

FIG. 5 illustrates a detailed flowchart of the method of FIG. 5, according to an exemplary embodiment of the inventive concept.

Referring to FIG. 5, in operation S410, the apparatus 100 determines whether the property information of the animation, the property being received through the API, includes an interpolation-required property.

As a determination result, if the property of the animation indicates that the animation requires interpolation, the apparatus 100 changes the animation processing mode to the interpolated animation mode in operation S420.

For example, if the property of the animation includes at least one of pause, reverse, seek, and time line animation, the apparatus 100 may determine that the animation requires interpolation and may determine the animation processing mode as the interpolated animation mode.

In this case, if the animation processing mode is previously set as the CSS3 animation mode, the apparatus 100 may change the CSS3 animation mode to the interpolated animation mode, and if the animation processing mode is previously set as the interpolated animation mode, the apparatus 100 may maintain the interpolated animation mode.

If the animation processing mode is changed to the interpolated animation mode, the apparatus 100 calculates matrices of objects at a changed time point in operation S430. After, calculating the matrix of each of the objects for each frame, the apparatus 100 transmits a rendering command to the web engine unit 240 based on the calculated matrix in operation S440.

The apparatus 100 determines whether the interpolated animation has ended in operation S450, and if the interpolated animation has not ended, the apparatus 100 may repeat an operation of calculating a matrix S430.

As a determination result in operation S410, if the property of the animation indicates that the animation does not require interpolation, the apparatus 100 changes the animation processing mode to the CSS3 animation mode in operation S460.

For example, if the property of the animation includes at least one of translate, opacity, scale, rotate, perspective, and matrix, the apparatus 100 may determine that the animation does not require interpolation and may determine the animation processing mode as the CSS3 animation mode.

In this case, if the animation processing mode is previously set as the interpolated animation mode, the apparatus 100 may change the interpolated animation mode to the CSS3 animation mode, and if the animation processing mode is previously set as the CSS3 animation mode, the apparatus 100 may maintain the CSS3 animation mode.

If the animation processing mode is changed to the CSS3 animation mode, the apparatus 100 processes the CSS3 animation based on a target matrix and CSS3 transition in operation S470. If the animation processing mode is previously set as the CSS3 animation mode, the animation engine unit 230 may set a target matrix and transmit a rendering command to the web engine unit 240. When the web engine unit 240 receives the target matrix (e.g., translate X(600)) from the animation engine unit 230, the web engine unit 240 may process the animation so that a corresponding object moves from 0 to 600 on an X axis. That is, the web engine unit 240 may directly perform a calculation in an intermediate operation of the animation.

In addition, the web engine unit 240 may process the CSS3 animation based on the CSS3 transition. For example, the CSS3 transition may include at least one of a delay, a direction, a duration, and an iteration-count.

The method of processing an animation, according to one or more exemplary embodiments of the inventive concept, may be implemented in a program instruction form executable through various computer devices and recorded in a non-transitory computer-readable recording medium. The non-transitory computer-readable recording medium may include program instructions, data files, data structures, and the like, taken alone or in combination. The program instructions recorded in the medium may be particularly created and configured for the one or more exemplary embodiments or may be well-known and by one of ordinary skill in computer software. Examples of the non-transitory computer-readable recording medium are magnetic media such as hard disks, floppy disks, and magnetic tapes, optical media such as CD-ROMs and digital versatile discs (DVDs), magneto-optical media such as floptical disks, and hardware devices, such as read-only memory (ROM), random-access memory (RAM), flash memories, and the like, particularly configured to store and execute program instructions. The program instructions may include, for example, not only machine language codes made by a compiler but also high-language codes executable by a computer or processor by using an interpreter or the like.

The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the apparatus for processing an animation described herein.

The apparatus and method for processing an animation, according to one or more exemplary embodiments, may optimize animation processing by adaptively using a CSS3 animation processing method or an interpolated animation processing method according to a property of the animation.

The apparatus and method for processing an animation, according to one or more exemplary embodiments, may provide the advantages of both the CSS3 animation processing method and the interpolated animation processing method.

It should be understood that the exemplary embodiments described herein should be considered in a descriptive sense only and not for purposes of limitation. Descriptions of the features or aspects within each exemplary embodiment should typically be considered as being available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An apparatus for processing an animation, the apparatus comprising:
   at least one memory storing instructions; and
   at least one hardware-based processor that executes the instructions stored in the at least one memory to cause the following to be performed:
      to determine an animation processing mode as an interpolated animation mode or a cascading style sheets level 3 (CSS3) animation mode according to property information of the animation, the property information being received through an application program interface (API);
      to determine the animation processing mode as the CSS3 animation mode if it is determined that the property information of the animation does not include an interpolation-required property; and
      to determine the animation processing mode as the interpolated animation mode if it is determined that the property information of the animation includes the interpolation-required property;
      to calculate a matrix of an object of the animation for each frame and to process the animation based on the calculated matrix if the animation processing mode is determined as the interpolated animation mode; and
      to process the animation based on a target matrix of the object and a CSS3 transition if the animation processing mode is determined as the CSS3 animation mode.

2. The apparatus of claim 1, wherein the interpolation-required property includes at least one of pause, reverse, seek, and time line animation.

3. The apparatus of claim 1, wherein the at least one hardware-based processor further executes the stored instructions to set a default mode of the animation processing mode as the CSS3 animation mode and to change the CSS3 animation mode to the interpolated animation mode if it is determined that the property information of the animation includes the interpolation-required property.

4. The apparatus of claim 3, wherein the at least one hardware-based processor further executes the stored instructions to calculate a matrix of the object at a changed time point if the animation processing mode is changed from the CSS3 animation mode to the interpolated animation mode.

5. The apparatus of claim 3, wherein the at least one hardware-based processor further executes the stored instructions to set a target matrix of the object if the animation processing mode is changed from the interpolated animation mode to the CSS3 animation mode.

6. The apparatus of claim 1, wherein the target matrix indicates a target location of the object.

7. The apparatus of claim 1, wherein the CSS3 transition includes at least one of a delay, a direction, a duration, and an iteration-count of the animation.

8. A method of processing an animation, the method comprising:
   determining, using at least one hardware-based processor that executes instructions stored in at least one memory, an animation processing mode as an interpolated animation mode or a cascading style sheets level 3 (CSS3) animation mode according to property information of the animation, the property information being received through an application program interface (API);

calculating, using the at least one hardware-based processor, a matrix of an object of the animation for each frame and processing the animation based on the calculated matrix if the animation processing mode is determined as the interpolated animation mode; and processing, using the at least one hardware-based processor, the animation based on a target matrix of the object and a CSS3 transition if the animation processing mode is determined as the CSS3 animation mode wherein the determining comprises determining the animation processing mode as the CSS3 animation mode if it is determined that the property information of the animation does not include an interpolation-required property, and determining the animation processing mode as the interpolated animation mode if it is determined that the property information of the animation includes the interpolation-required property.

9. The method of claim 8, wherein the interpolation-required property includes at least one of pause, reverse, seek, and time line animation.

10. The method of claim 8, further comprising:
setting a default mode of the animation processing mode as the CSS3 animation mode; and
changing the CSS3 animation mode to the interpolated animation mode if it is determined that the property information of the animation includes the interpolation-required property.

11. The method of claim 10, further comprising calculating a matrix of the object at a changed time point if the animation processing mode is changed from the CSS3 animation mode to the interpolated animation mode.

12. The method of claim 10, further comprising setting a target matrix of the object if the animation processing mode is changed from the interpolated animation mode to the CSS3 animation mode.

13. The method of claim 8, wherein the target matrix indicates a target location of the object.

14. The method of claim 8, wherein the CSS3 transition includes at least one of a delay, a direction, a duration, and an iteration-count of the animation.

15. A non-transitory computer-readable medium having recorded thereon a computer-readable program for execution by at least one hardware-based processor for performing the method of claim 8.

* * * * *